No. 638,156. Patented Nov. 28, 1899.
J. WIGGINS.
HANDLE BAR AND POST ADJUSTMENT.
(Application filed Feb. 14, 1899.)
(No Model.)
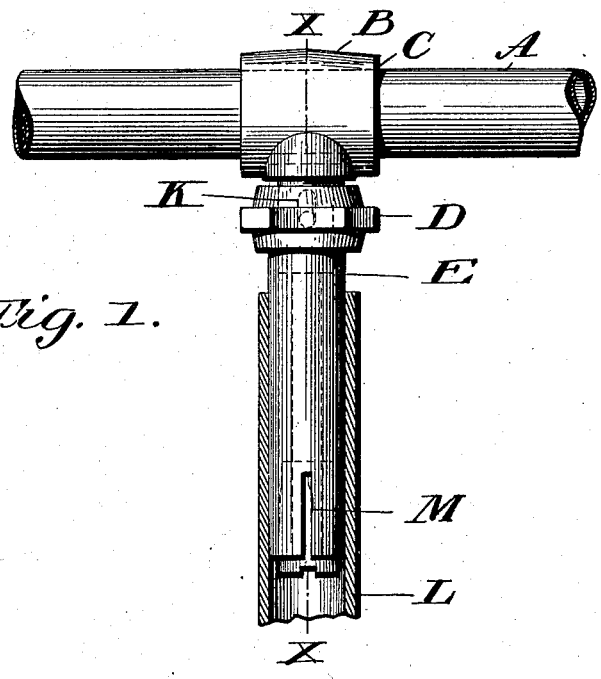
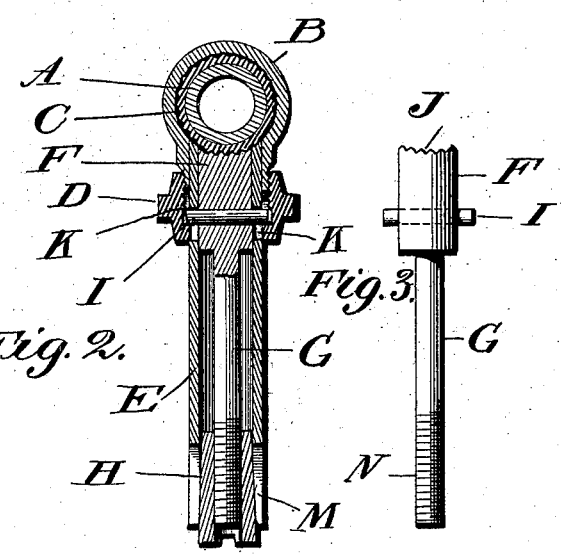
Witnesses
L. C. Hills,
W. B. Keefer
Inventor:
John Wiggins,
By James L. Norris
Attorney

UNITED STATES PATENT OFFICE.

JOHN WIGGINS, OF MARSHALL, MICHIGAN, ASSIGNOR OF ONE-HALF TO ARTHUR BACON, OF SAME PLACE.

HANDLE-BAR AND POST ADJUSTMENT.

SPECIFICATION forming part of Letters Patent No. 638,156, dated November 28, 1899.

Application filed February 14, 1899. Serial No. 705,509. (No model.)

*To all whom it may concern:*

Be it known I, JOHN WIGGINS, a citizen of the United States, residing at Marshall, in the county of Calhoun and State of Michigan, have invented new and useful Improvements in Adjustable Handle-Bar Clamps for Bicycles, of which the following is a specification.

This invention has for its object to provide new and improved means for adjustably securing handle-bars or seat-posts of bicycles; and to accomplish this object my invention consists in the features of construction and in the combination or arrangement of parts hereinafter described and claimed, reference being made to the accompanying drawings, in which—

Figure 1 shows a front elevation of a portion of a handle-bar and handle-bar support, together with a section of the standard into which the support fits. Fig. 2 shows a vertical sectional view of the handle-bar and the handle-bar support, taken on line $xx$ of Fig. 1; and Fig. 3 shows a detached view of the shank used in making the adjustment.

Similar letters refer to similar parts throughout the several views.

In order to enable those skilled in the art to make and use my invention, I will now describe the same in detail, referring to the drawings, wherein—

The letter A indicates a handle-bar, and E a handle-bar or seat-post support composed of a cylinder provided at its upper end portion with an external screw-thread engaged by a nut D. As here shown, the said external screw-thread is formed in a socket B, constituting a part of the upper end portion of the support E, and through which the handle-bar extends. The handle-bar is preferably provided with a collar or ferrule C, lying in the socket part B of the support. The lower end of this support E is constructed with longitudinal slots M, the object of these slots being to allow the lower end of the post or support E to be expanded by means of a tapering plug, which tapering plug is shown by H, and which is preferably made in the form of a nut adapted to engage with the screw-thread N on the lower end of the shank G. The plug H is also preferably provided with means for revolving the same upon the shank, whereby it may be adjusted longitudinally thereon. By this construction the plug can be so adjusted as to give greater or less expansion to the slotted lower end portion of the post or support E. The upper end of the shank G is provided with a head F, having in its upper side corrugations or grooves, as shown at J.

I is a pin passing through the head F and extending beyond the same on either side.

The head F of the shank is adapted when raised, as hereinafter described, to come in contact with the grooved or corrugated ferrule C in order to retain the handle-bar in any required position. The ends of the pin I, which extend beyond the surface of the head F of the shank G, rest in an annular groove in the nut D, said groove being of sufficient width to allow the nut to be turned freely without binding the ends of the said pin I.

K are slots in the upper end portion of the post or support E, each end of the pin I resting in one of the slots K.

L is the tubular standard or outer cylinder to which the support E is attached. The construction is such that by revolving the nut D the pin I, which passes through the shank G, is raised and lowered to raise and lower said shank. When the shank is raised, the plug H is drawn into the lower end of the support E, spreading the same and securely and rigidly attaching the said support to the cylinder L. At the same time that the shank draws the plug H into the lower end of the support E, spreading the same, the upper or corrugated end J is brought into contact either directly with the handle-bar A or with the corrugated ferrule C, attached thereto, thereby rigidly securing the handle-bar in place. When the nut D is turned in the opposite direction, the tapering plug H may move downward, allowing the lower end of the support E to assume its normal size, when the handle-bar and the handle-bar support or seat and seat-support, as the case may be, may be raised or lowered to any required position and secured therein by drawing the plug H into the lower end or slotted portion of the support E. It will be evident that this invention is adapted to adjust and secure the bicycle-seat or bicycle handle-bar in any required position, and is also adapted to adjust the position of the handle-bar in the socket or the seat in the proper position at the same time. It may also be used for any analogous purpose.

Having thus described my invention, what I claim to have invented, and desire to secure by Letters Patent, is—

1. The combination with an outer cylinder, of an inner cylinder slotted at its upper and lower end portions and provided at its upper end portion with an external screw-thread, an axially-turning handle-bar carried by the upper end of the inner cylinder, a tapering plug fitted into the slotted lower end portion of the inner cylinder, a shank connected at its lower end with said plug and constructed at its upper end to engage and disengage said handle-bar, a nut engaging said external screw-thread and having an annular groove in its inner side, and a pin extending from the upper end portion of said shank through the upper slotted end of the inner cylinder into the annular groove of said nut, substantially as and for the purpose described.

2. In combination with a handle-bar, the socket through which said handle-bar passes, the screw-threaded handle-bar support slotted at its upper and lower end portions, a nut engaging the screw-thread of said handle-bar support, a shank provided with a tapering plug adapted to fit in and expand the lower slotted end portions of said support, and a pin passing through the said shank and the upper slotted end portion of said support to engage with the nut, the upper end of the shank corrugated or notched to engage with the handle-bar when the shank is raised by means of the nut and pin, substantially as described.

In testimony whereof I have hereunto set my hand in presence of two subscribing witnesses.

JOHN WIGGINS.

Witnesses:
ARTHUR BACON,
J. LESLIE FRENCH.